US009995989B2

(12) United States Patent
Hasuda et al.

(10) Patent No.: US 9,995,989 B2
(45) Date of Patent: Jun. 12, 2018

(54) SHUTTER DEVICE AND IMAGE-CAPTURING APPARATUS

(71) Applicant: NIKON CORPORATION, Tokyo (JP)

(72) Inventors: Masanori Hasuda, Fujisawa (JP); Kenji Ohashi, Tokyo (JP); Takeshi Ueki, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 0 days. days.

(21) Appl. No.: 15/521,974

(22) PCT Filed: Oct. 30, 2015

(86) PCT No.: PCT/JP2015/080815
§ 371 (c)(1),
(2) Date: Aug. 25, 2017

(87) PCT Pub. No.: WO2016/068320
PCT Pub. Date: May 6, 2016

(65) Prior Publication Data
US 2017/0351162 A1    Dec. 7, 2017

(30) Foreign Application Priority Data

Oct. 31, 2014   (JP) ................. 2014-223428

(51) Int. Cl.
*G03B 9/36*  (2006.01)
*G03B 9/18*  (2006.01)
*H04N 5/225* (2006.01)

(52) U.S. Cl.
CPC ............. *G03B 9/36* (2013.01); *G03B 9/18* (2013.01); *H04N 5/2254* (2013.01)

(58) Field of Classification Search
CPC .......... H04N 5/2254; G03B 9/18; G03B 9/36; G03B 9/08

(Continued)

(56) References Cited

U.S. PATENT DOCUMENTS 6,795,122 B2 * 9/2004 Takahashi ............ H04N 5/2254
                                                   348/362
8,840,325 B1 * 9/2014 Kawakami ............... G03B 9/20
                                                   396/486

(Continued)

FOREIGN PATENT DOCUMENTS

JP    2008-164804 A    7/2008

OTHER PUBLICATIONS

Feb. 2, 2016 Search Report issued in International Patent Application No. PCT/JP2015/080815.

*Primary Examiner* — Nhan T Tran
(74) *Attorney, Agent, or Firm* — Oliff PLC (57) ABSTRACT

A shutter device includes: a substrate having an opening; a first light-shielding member that moves from a first position outside the opening of the substrate to a second position outside the opening to shield the opening, the second position being different from the first position; a second light-shielding member that partly shields the opening while moving from the first position to the second position; a first moving member that has a protrusion moving along a hole provided in the substrate to move the first light-shielding member; a second moving member that is coupled to the second light-shielding member and moves together with the second light-shielding member; and a third moving member, located outside a movement range of the protrusion during the second light-shielding member being located in the first position, that is coupled to the second light-shielding member and moves together with the second light-shielding member.

6 Claims, 7 Drawing Sheets (58) Field of Classification Search
USPC .......................................................... 348/362
See application file for complete search history.

(56) References Cited

U.S. PATENT DOCUMENTS

| | | | | |
|---|---|---|---|---|
| 2001/0010560 A1* | 8/2001 | Takahashi | ................ | G03B 9/18 |
| | | | | 348/367 |
| 2004/0213561 A1* | 10/2004 | Ichinose | ................ | G03B 9/08 |
| | | | | 396/487 |
| 2004/0223758 A1* | 11/2004 | Nakano | ................ | G03B 9/18 |
| | | | | 396/489 |
| 2006/0067676 A1* | 3/2006 | Toyoda | ................ | G03B 9/08 |
| | | | | 396/466 |
| 2007/0237518 A1* | 10/2007 | Ichihara | ................ | G03B 9/08 |
| | | | | 396/466 |
| 2011/0176799 A1* | 7/2011 | Shintani | ................ | G03B 9/14 |
| | | | | 396/484 |
| 2011/0222843 A1* | 9/2011 | Al | ................ | G03B 9/22 |
| | | | | 396/469 |
| 2012/0033961 A1* | 2/2012 | Chung | ................ | G03B 9/18 |
| | | | | 396/463 |
| 2014/0016023 A1* | 1/2014 | Min | ................ | G03B 9/08 |
| | | | | 348/362 |
| 2014/0160312 A1* | 6/2014 | Shintani | ................ | H04N 5/23245 |
| | | | | 348/220.1 |

* cited by examiner

SHUTTER DEVICE AND IMAGE-CAPTURING APPARATUS

TECHNICAL FIELD

The present invention relates to a shutter device and an image-capturing apparatus.

BACKGROUND ART

So-called normally open type shutter devices having a front curtain light-shielding blade and a rear curtain light-shielding blade are known. In an electronic camera equipped with such a shutter device, a front curtain light-shielding blade is withdrawn from a photographic opening of the shutter device to one side in a shift direction of light-shielding blades, while a rear curtain light-shielding blade is withdrawn to the other side in order to display a preview image in a photographing preparation state before an actual exposure (see PTL1, for example).

CITATION LIST

Patent Literature

PTL1: Japanese Laid-Open Patent Publication No. 2008-164804

SUMMARY OF INVENTION

Technical Problem

In the electronic camera provided with the shutter device described in PTL1, the front curtain light-shielding blade which has been withdrawn from the photographic opening to one side is shifted toward the other side to shield the photographic opening, so that a reset operation of the image sensor is performed before the actual exposure. Then, the front curtain light-shielding blade and the rear curtain light-shielding blade are shifted toward the one side with a predetermined time difference to expose an image sensor. A release time lag is thus increased.

However, no specific configuration of a shutter device that can further reduce the release time lag has been proposed.

Solution to Problem

According to the 1st aspect of the present invention, a shutter device comprises: a substrate having an opening; a first light-shielding member that moves from a first position outside the opening of the substrate to a second position outside the opening to shield the opening, the second position being different from the first position; a second light-shielding member that partly shields the opening while moving from the first position to the second position; a first moving member that has a protrusion moving along a hole provided in the substrate to move the first light-shielding member; a second moving member that is coupled to the second light-shielding member and moves together with the second light-shielding member; and a third moving member, located outside a movement range of the protrusion during the second light-shielding member being located in the first position, that is coupled to the second light-shielding member and moves together with the second light-shielding member.

According to the 2nd aspect of the present invention, it is preferred that in the shutter device according to the 1st aspect, the third moving member is curved so as to locate between a movement range of the first moving member and the opening while the second light-shielding member is located in the first position, According to the 3rd aspect of the present invention, it is preferred that in the shutter device according to the 1st or 2nd aspect, the second moving member and the third moving member constitute a parallel link mechanism for moving the second light-shielding member; and the third moving member at least partly overlaps the second moving member.

According to the 4th aspect of the present invention, it is preferred that in the shutter device according to the 3rd aspect, each of the second moving member and the third moving member is coupled to the second light-shielding member on one of surfaces of the second light-shielding member; and one of the second moving member and the third moving member has a step in an area where the members overlap each other, According to the 5th aspect of the present invention, it is preferred that in the shutter device according to the 3rd aspect, the second moving member and the third moving member are coupled to the second light-shielding member on opposite surfaces of the second light-shielding member.

According to the 6th aspect of the present invention, an image-capturing apparatus comprises: the shutter device according to any one of 1st to 5th aspects; and an image sensor that receives subject light through the shutter device.

DESCRIPTION OF EMBODIMENTS

An image-capturing apparatus including a shutter device according to an embodiment will be described with reference to the drawings.

Figure 1:
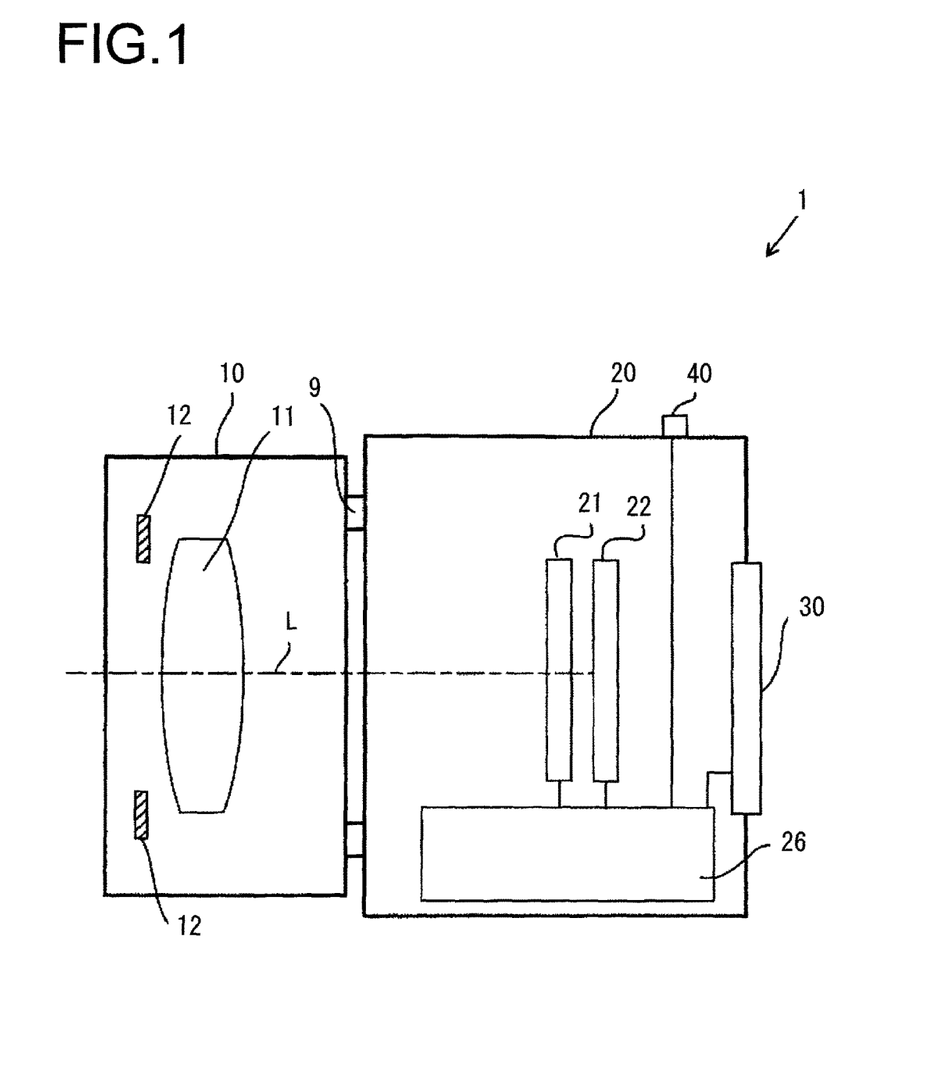
FIG. 1 is a view illustrating a configuration of main components of a digital camera which is an image-capturing apparatus according to an embodiment.

FIG. 1 is a view illustrating a configuration of main components of a digital camera 1 which is an image-capturing apparatus according to an embodiment As illustrated in FIG. 1, the digital camera 1 is a so-called mirrorless camera including a camera body 20 and a lens barrel 10 that is removably attached to the camera body 20 with a lens mount 9 therebetween. The digital camera 1 may be a single lens reflex camera, instead of a mirrorless camera.

The lens barrel 10 includes an image-forming optical system 11 and a diaphragm 12. The image-forming optical system 11 is an optical system constituted by a plurality of lenses including a focus adjusting lens, for forming a subject image on a predetermined image-forming plane. The focus adjusting lens is moved back and forth in an optical axis L direction by the operation of a lens driving motor (not shown). FIG. 1 schematically illustrates the image-forming optical system 11 as a single lens, for convenience of illustration. The diaphragm 12 limits light flux passing through the image-forming optical system 11, that is, an amount of incident light.

The camera body 20 has a shutter device 21, an image sensor 22, and a controller 26 provided therein. The camera body 20 also has a rear side monitor 30, which includes a display device such as a liquid crystal display, provided on its rear side. The camera body 20 further has an operating unit 40 provided thereon.

The image sensor 22 is an image sensor having a number of pixels arranged in a matrix, such as a CMOS image sensor. The image sensor 22 is arranged so that its image-capturing plane is positioned on the image-forming plane of the image-forming optical system 11. The image sensor 22 receives subject light through the shutter device 21. In other words, the image sensor 22 captures the subject image formed on the image-capturing plane by the image-forming optical system 11 through he shutter device 21 and outputs image-capturing signals to the controller 26. Furthermore, various optical filters including an infrared cut filter are provided on the image-capturing plane of the image sensor 22, although not illustrated in FIG. 1. The plurality of pixels constituting the image sensor 22 are two-dimensionally arranged in a pixel row direction (the X axis direction in FIG. 2 described later) and in a pixel column direction (the Y axis direction in FIG. 2 described later) that is orthogonal to the pixel row direction. The pixels are reset and the image-capturing signals are read out for each of pixel rows at different positions in the pixel column direction at different timings.

The shutter device 21 is provided on a front side (a subject side) of the image sensor 22. The shutter device 21 is a so-called focal plane shutter that is driven by a front curtain actuator and a rear curtain actuator (not shown) in accordance with driving signals from a power control unit (not shown) of a controller 26 described later, to shield light flux which would be incident onto the image sensor 22 from the subject. Details of the shutter device 21 will be described later.

The controller 26, which is constituted by a microprocessor, its peripheral circuits, and other circuits, controls components of the digital camera 1 by reading and executing control programs stored in advance in a storage medium (not shown) such as a flash memory. The controller 26 performs various image processing operations on the image-capturing signals output from the image sensor 22 to generate image data of the subject image and record the generated image data in a portable storage medium (not shown) such as a memory card. The controller 26 controls operations of the shutter device 21 and the image sensor 22, as described later. The controller 26 has the power control unit (not shown) that functions to control the operation of the shutter device 21.

The controller 26 may be made of electronic circuits having functions equivalent to functions of the control programs.

The operating unit 40 includes various switches allocated to various operating members operated by a user, and outputs operation signals corresponding to operations of the operating members to the controller 26. The operating members include, for example, a release button, a menu button for displaying a menu screen on the rear side monitor 30, a cross key that is operated for selecting various settings and the like, a determination button for determining the settings and the like selected with the cross key, and a mode switching button for switching an operation mode of the digital camera 1 between a photographing mode and a reproduction mode.

Details of the shutter device 21 according to this embodiment will now be described.

Figure 2:
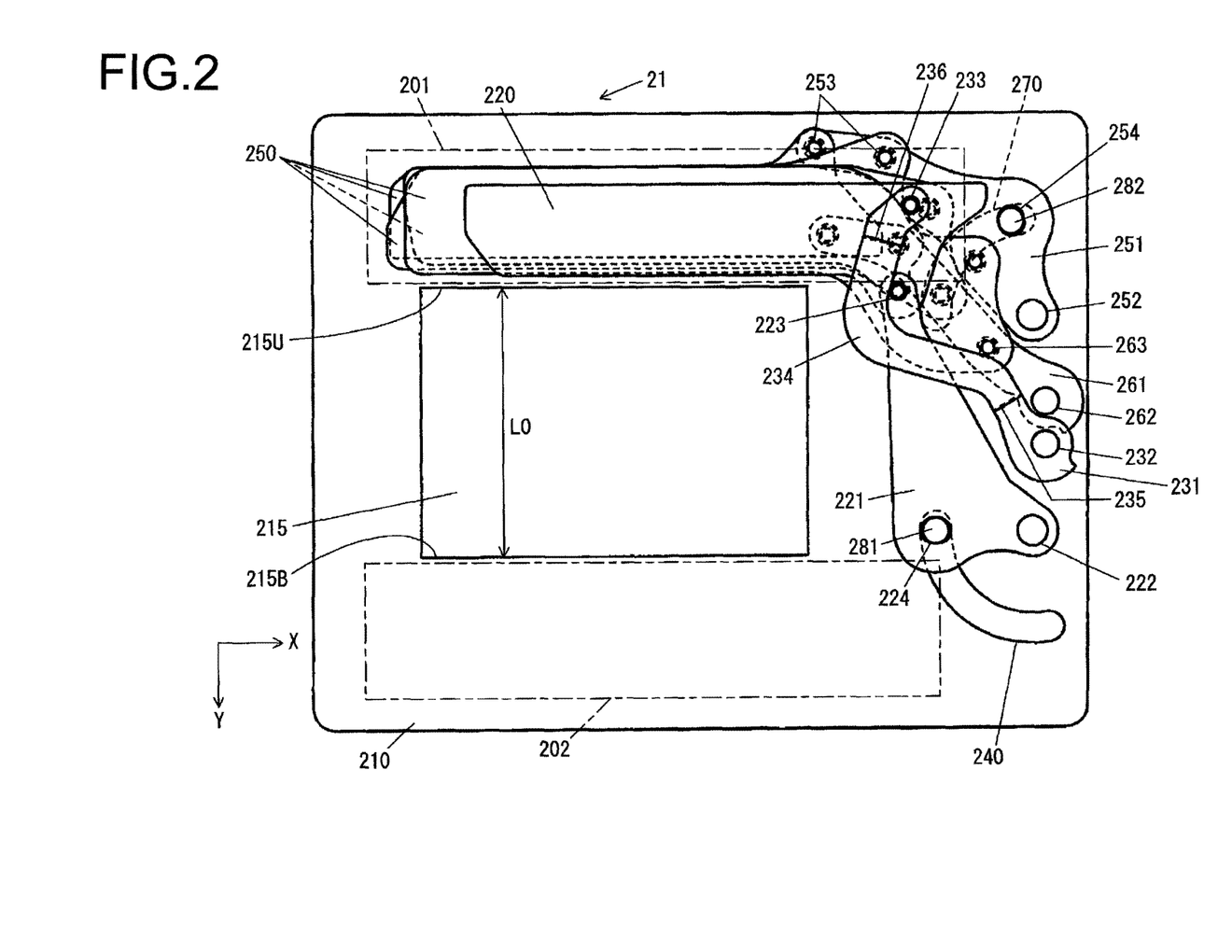
FIG. 2 is a view illustrating an internal configuration of a shutter device.
Figure 3:
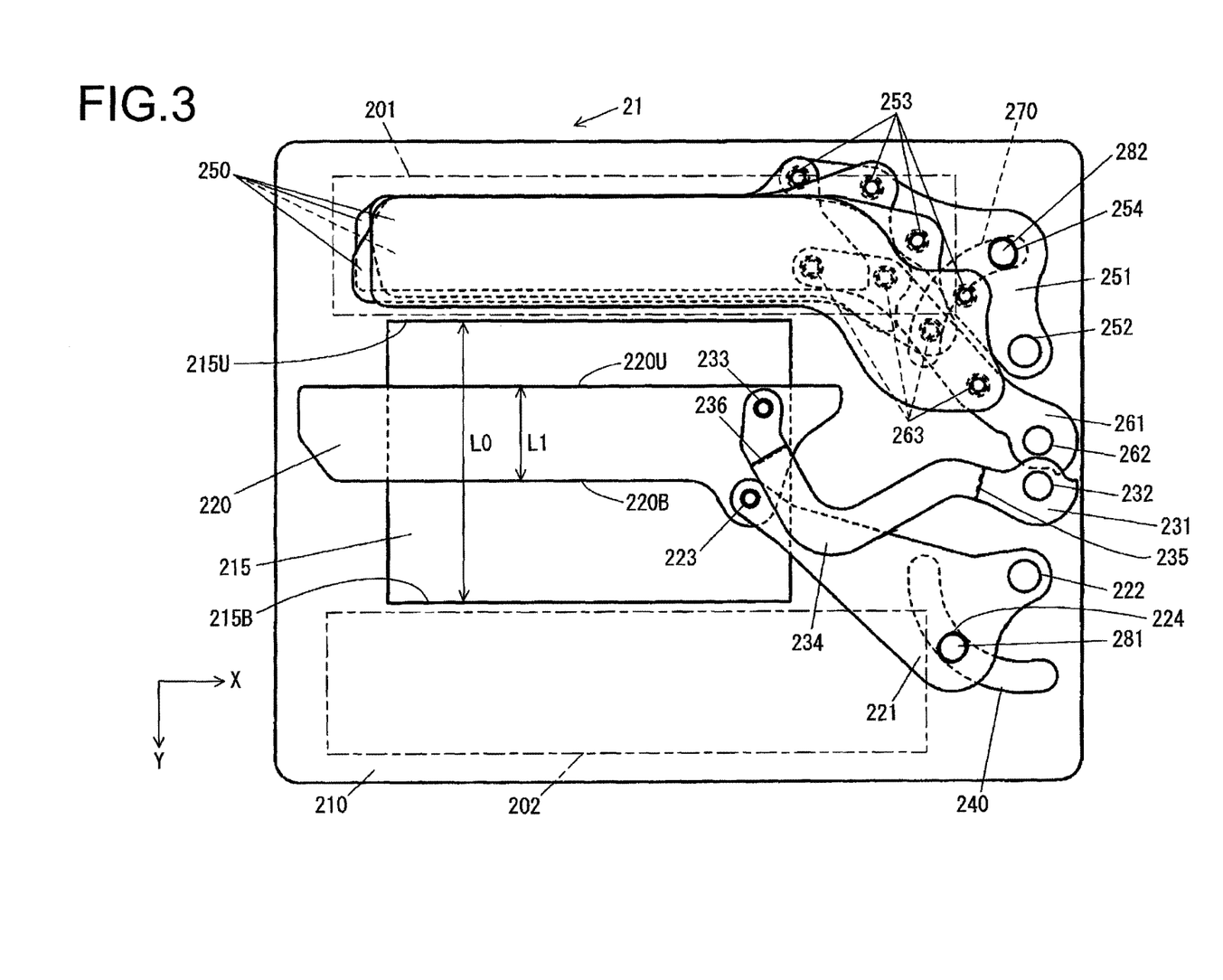
FIG. 3 is a view illustrating the internal configuration of the shutter device.
Figure 4:
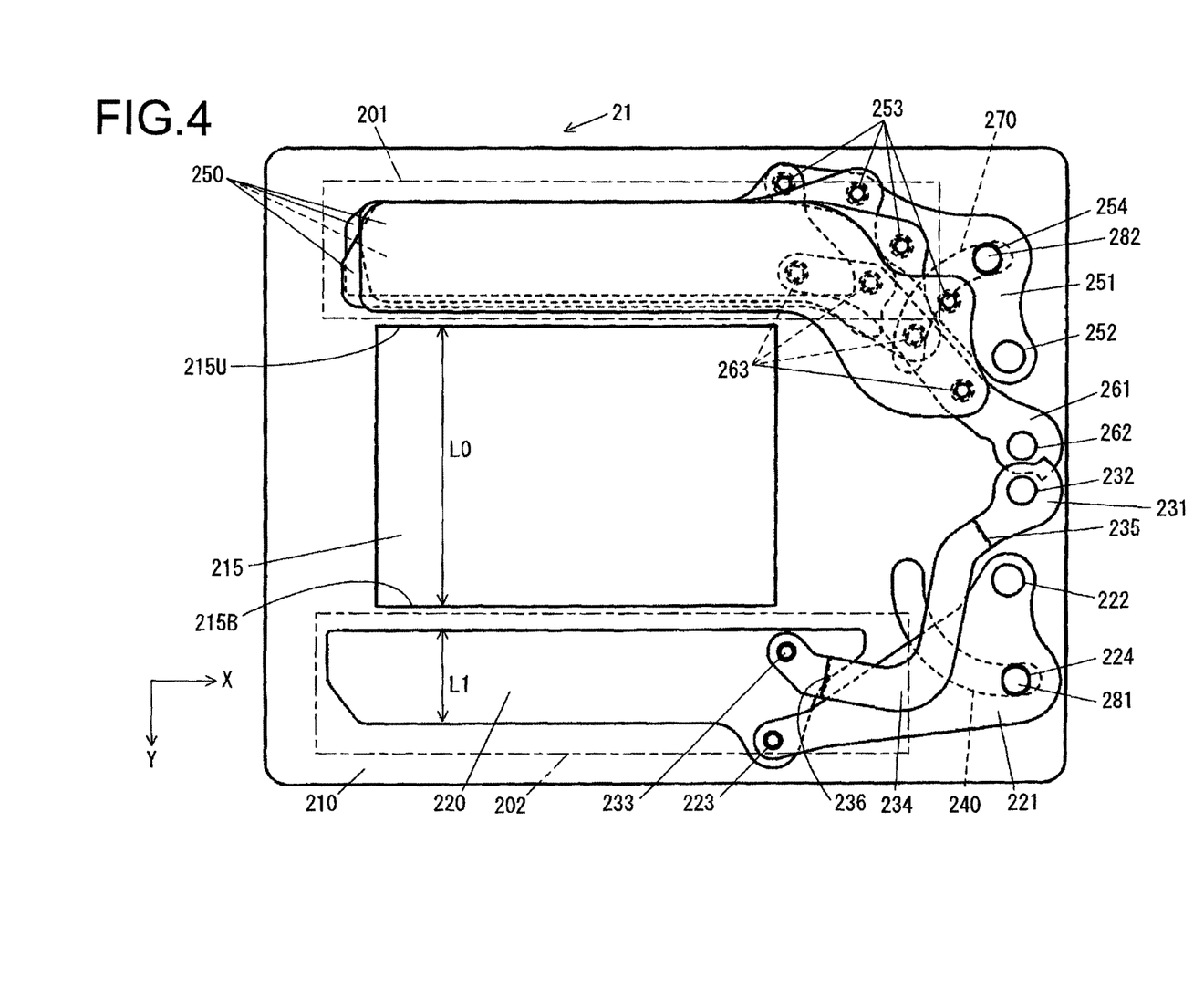
FIG. 4 is a view illustrating the internal configuration of the shutter device.

FIGS. 2 to 4 are views illustrating an internal configuration of the shutter device 21 as seen from the image-capturing sensor 22 side, that is, the rear side of the digital camera 1. For convenience of explanation, a coordinate system having the X axis and the axis will he defined as illustrated in the figures. FIG. 2 is a view illustrating a state of the shutter device 21 before a start of photographing is instructed by an operation of the release button, where both a front curtain light-shielding blade 220 and a rear curtain light-shielding blade 250 described later have been withdrawn in a first withdrawn position (a first position) 201 above a shutter opening (an opening) 215. FIG. 3 illustrates a state of the shutter device 21 after the user operates the release button to instruct the start of photographing, where the front curtain light-shielding blade 220 has started moving downward to traverse the opening 215, while the rear curtain light-shielding blade 250 has not yet started to move. FIG. 4 is a view illustrating a state where the front curtain light-shielding blade 220 has moved further downward from the position illustrated in FIG. 3 to withdraw into a second withdrawn position (a second position) 202 below the opening 215, while the rear curtain light-shielding blade 250 has not yet started to move.

The shutter device 21 includes the substrate 210, the front curtain light-shielding blade 220, the rear curtain light-shielding blade 250, a front curtain driving arm 221, a front curtain driven arm 231, a rear curtain driving arm 251, a rear curtain driven arm 261, the front curtain actuator (not shown), and the rear curtain actuator (not shown). In this embodiment, each of the front curtain actuator and the rear curtain actuator is made of an electric motor or the like.

The substrate 210 is fixed in the camera body 20 and has an opening 215 to expose the image sensor 22 with light flux from the subject. The opening 215 is formed into a rectangular shape having two sides extending in the X axis direction and two sides extending along the Y axis direction. In the following description, a side of the opening 215 on the negative Y axis side will he referred to as an upper end 215U, a side on the positive Y axis side will be referred to a bottom end 215B, and the length in the Y axis direction between the upper end 215U and the bottom end 215B will be denoted by L0.

—Front Curtain—

As well illustrated in FIG. 3, for example, the front curtain driving arm 221 has a substrate-side coupling part 222 in one end, at which the front curtain driving arm 221 is rotatably pivoted by the substrate 210 on the rear side (the image sensor 22 side) of the substrate 210. The front curtain driven arm 231 has a substrate-side coupling part 232 in one end, at which the front curtain driven arm 231 is rotatably pivoted by the substrate 210 on the rear side (the image sensor 22 side) of the substrate 210, above the front curtain driving arm 221 in the figures. The front curtain driving arm 221 has a light-shielding a member-side coupling part 223 at the other end, at which the front curtain light-shielding blade 220 is rotatably coupled to the front curtain driving arm 221 with a caulking The front curtain driven arm 231 has a light-shielding member-side coupling part 233 at the other end, at which the front curtain light-shielding blade 220 is rotatably coupled to the front curtain driven arm 231 with a caulking pin. The front curtain driving arm 221 and the front curtain driven arm 231 constitute a known parallel link mechanism for moving the front curtain light-shielding blade 220.

It should be noted that the front curtain driving arm 221 and the front curtain driven arm 231 are provided below the rear curtain driving arm 251 and the rear curtain driven arm 261. Specifically, the substrate-side coupling part 222 of the front curtain driving arm 221 and the substrate-side coupling part 232 of the front curtain driven arm 231 are coupled to the substrate 210 below the substrate-side coupling part 252 of the rear curtain driving arm 251 and the substrate-side coupling part 262 of the rear curtain driven arm 261 in the figures.

The front curtain light-shielding blade 220 is a light-shielding member that extends in the X axis direction and is pivoted by the front curtain driving arm 221 and the front curtain driven arm 231 at its right end. In this embodiment, the front curtain light-shielding blade 220 is made of a single blade.

The front curtain driving arm 221 has a hole 224, into which a front curtain driving pin 281 penetrating through an elongated hole 240 of the substrate 210 is inserted from the depth side of the paper plane, that is, from the front side of the digital camera 1. The front curtain driving pin 281 is driven by the front curtain actuator (not shown). The front curtain actuator is driven by a driving current, that is, power supply from a power supply unit (not shown) of the controller 26. When the front curtain driving pin 281 is driven along the elongated hole 240 by the front curtain actuator, the front curtain driving arm 221 and the front curtain driven arm 231 rotate about the substrate-side coupling part 222 and the substrate-side coupling part 232, respectively.

When the front curtain driving arm 221 is rotated about the substrate-side coupling portion 222, the front curtain light-shielding blade 220 is driven by the known parallel link mechanism, which is constituted by the front curtain driving arm 221, the front curtain driven arm 231, and the front curtain light-shielding blade 220, to move across the opening 215 of the substrate 210 in the Y axis direction, as described above. In this embodiment, the front curtain light-shielding blade 220 can move between the first withdrawn position 201 which is a first position outside the opening 215 and the second withdrawn position 202 which is a second position outside the opening 215, the second position being opposite to the first position (FIG. 2). It should be noted that the first withdrawn position 201 and the second withdrawn position 202 are opposite to each other with the opening 215 therebetween, where the first withdrawn position 201 is provided above the opening 215 in the figures and the second withdrawn position 202 is provided below the opening 215 in the figures. The front curtain light-shielding blade 220 has moved to the first withdrawn position 201 in FIG. 2 and in the second withdrawn position 202 in FIG. 4. As is apparent from FIGS. 2 to 4, the distance between the front curtain driven arm 231 and the first withdrawn position 201 is smaller than the distance between the front curtain driving arm 221 and the first withdrawn position 201.

As described above, the front curtain light-shielding blade 220 is made of a single blade. A length (a light-shielding width) L1 in the Y axis direction (a shift direction of the front curtain light-shielding blade 220 and the rear curtain light-shielding blade 250) between an upper edge 220U (FIG. 3) of the front blade light-shielding blade 220, which is a side extending in the X axis direction on the negative Y axis side, and a bottom edge 220B (FIG. 3), which is a side extending in the X axis direction on the positive Y axis side, is shorter (smaller) than the length L0 of the opening 215 in the Y axis direction. The front curtain light-shielding blade 220 can therefore only partly cover the opening 215, in terms of structure. In other words, the front curtain light-shielding blade 220 has a light-shielding range in its shift direction that is shorter than the length of the opening 215 in the shift direction, in terms of structure.

Although this embodiment describes the front curtain light-shielding blade 220 shifting on the rear side (the image sensor 22 side) of the opening 215, a variation of the embodiment contemplates the front curtain light-shielding blade 220 shifting on the front side (the subject side) of the opening 215. Furthermore, the front curtain light-shielding blade 220 is not limited to the configuration made of a single blade. Alternatively, the front curtain light-shielding blade 220 may be constituted by a plurality of blades and a light-shielding region formed by the plurality of blades may have a shorter (smaller) length in the Y axis direction than the length L0 of the opening 215 in the Y axis direction so as to not entirely cover the opening 215, —Rear Curtain—

As well illustrated in FIGS. 3 and 4, for example, the rear curtain driving arm 251 has a substrate-side coupling part 252 in one end, at which the rear curtain driving arm 251 is rotatably pivoted by the substrate 210 on the rear side (the image sensor 22 side) of the substrate 210. The rear curtain driven arm 261 has a substrate-side coupling part 232 in one end, at which the rear curtain driven arm 261 is rotatably pivoted by the substrate 210 on the rear side (the image sensor 22 side) of the substrate 210, below the rear curtain driving arm 251 in the figures. The rear curtain driving arm 251 has a light-shielding member-side coupling part 253 at the other end, at which a plurality of rear curtain light-shielding blades 250 are rotatably coupled to the rear curtain driving arm 251 with a caulking pin. The rear curtain driven arm 261 has a light-shielding member-side coupling part 263 at the other end, at which a plurality of rear curtain light-shielding blades 250 are rotatably coupled to the rear curtain driven arm 261 with a caulking pin. The rear curtain driving arm 251 and the rear curtain driven arm 261 constitute a known parallel link mechanism for moving the rear curtain light-shielding blade 250. It should be noted that the rear curtain driving arm 251 and the rear curtain driven arm 261 are provided above the front curtain driving arm 221 and the front curtain driven arm 231.

The rear curtain light-shielding blade 250 is a light-shielding member constituted by a plurality of blades extending in the X axis direction, each blade being pivoted by the rear curtain driving arm 251 and the rear curtain driven arm 261 at its right end.

The rear curtain driving arm 251 has a hole 254, into which a rear curtain driving pin 282 penetrating through an elongated hole 270 of the substrate 210 is inserted from the depth side of the paper plane, that is, from the front side of the digital camera 1. The rear curtain driving pin 282 is driven by the rear curtain actuator (not shown). The rear curtain actuator is driven by a driving current or power supply from a power supply unit (not shown) of the controller 26. When the rear curtain driving pin 282 is driven along the elongated hole 270 by the rear curtain actuator, the rear curtain driving arm 251 and the rear curtain driven arm 261 rotate about the substrate-side coupling part 252 and the substrate-side coupling part 262, respectively.

When the rear curtain driving arm 251 is rotated about the substrate-side coupling portion 252, the rear curtain light-shielding blade 250 is driven by the known parallel link mechanism constituted by the rear curtain driving arm 251, the rear curtain driven arm 261, and the rear curtain light-shielding blade 250 to move across the opening 215 of the substrate 210 in the Y axis direction, as described above. In this embodiment, the rear curtain light-shielding blade 250 can move to the first withdrawn position 201 and to a light-shielding position where the rear curtain light-shielding blade 250 entirely covers the opening 215. As illustrated in FIGS. 2 to 4, the plurality of blades of the rear curtain light-shielding blade 250 overlap one another in the first withdrawn position 201. Although not illustrated, the plurality of blades of the rear curtain light-shielding blade 250 are unfolded to shield the opening 215 in the light-shielding position.

In other words, the front curtain light-shielding blade 220 described above is a primary light-shielding member that partly shields the opening 215, while the rear curtain light-shielding blade 250 is a secondary light-shielding member that is arranged to be movable from the first withdrawn position 201 to the light-shielding position, independent of the primary light-shielding member.

Although this embodiment describes the rear curtain light-shielding blade 250 shifting on the rear side (the image sensor 22 side) of the opening 215, a variation of the embodiment contemplates the rear curtain light-shielding blade 250 shifting on the front side (the subject side) of the opening 215. Furthermore, although the rear curtain light-shielding blade 250 entirely shields the opening 215 in this embodiment, the rear curtain light-shielding blade 250 may partly shield the opening 215 in the same manner as the front curtain light-shielding blade 220. In this case, the rear curtain light-shielding blade 250 may be made of a single blade or may be constituted by a plurality of blades so as to not entirely cover the opening 215.

—The Front Curtain Driving Arm 221 and the Front Curtain Driven Arm 231—

Figure 5:
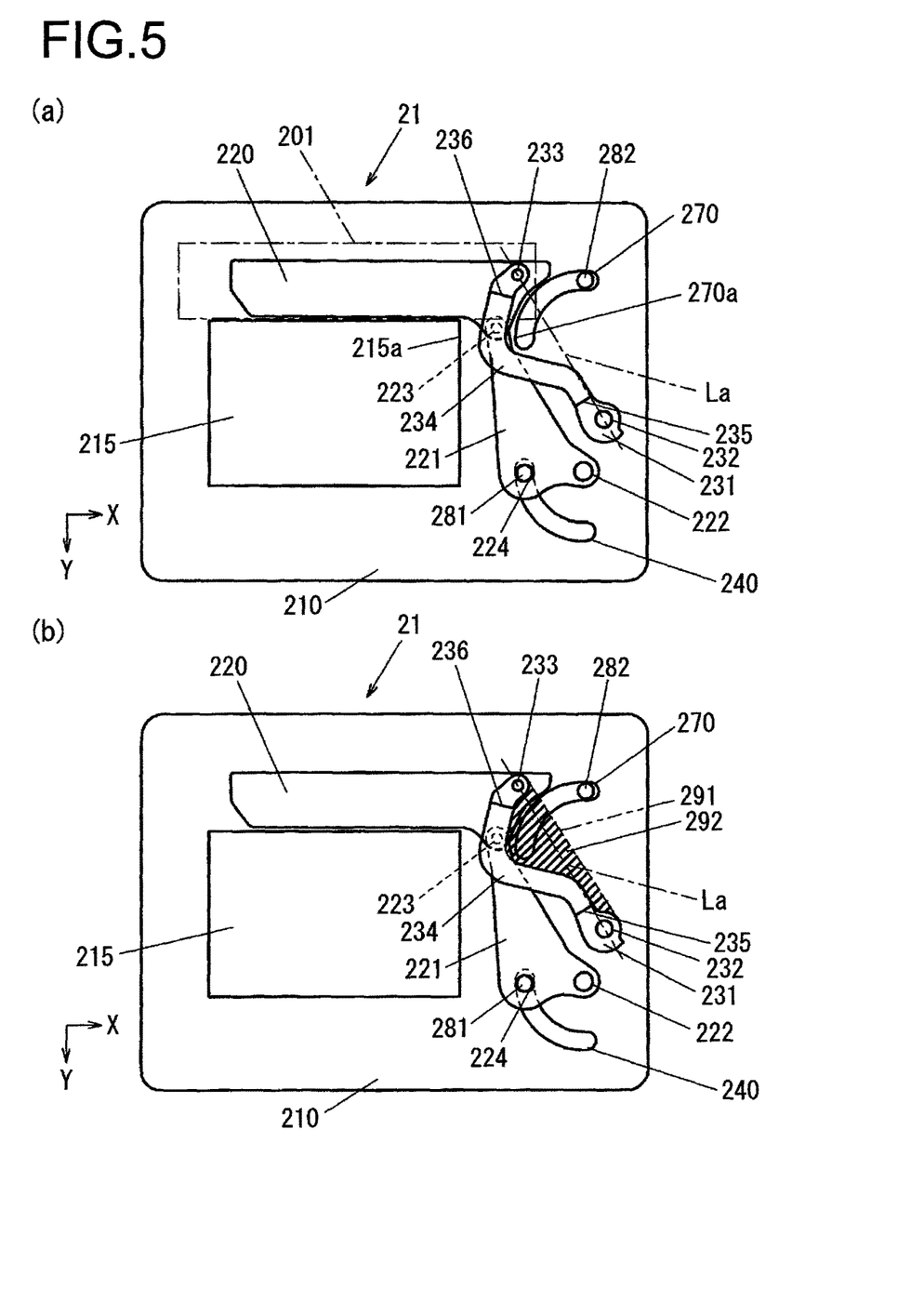
FIG. 5 is a view illustrating a front curtain driven arm.

FIGS. 5(*a*) and 5(*b*) are views illustrating a state where the front curtain light-shielding blade 220 is withdrawn in the first withdrawn position 201. In FIGS. 5(*a*) and 5(*b*), the rear curtain light-shielding blade 250, the rear curtain driving arm 251, and the rear curtain driven arm 261 are omitted for convenience of explanation.

In this embodiment, when the front curtain light-shielding blade 220 is withdrawn in the first withdrawn position 201 as illustrated in FIG. 5(*a*), a straight line La connecting the substrate-side coupling part 232 and the light-shielding member-side coupling part 233 of the front curtain driven arm 231 intersects an elongated hole 270 of the substrate 210. Specifically, the straight line La connecting the substrate-side coupling part 232 and the light-shielding member-side coupling part 233 of the front curtain driven arm 231 intersects a movement range of the rear curtain driving pin 282. In other words, the movement range of the rear curtain driving pin 282 extends between the substrate-side coupling part 232 and the light-shielding member-side coupling part 233 of the front curtain driven arm 231 having moved the front curtain light-shielding blade 220 into the first withdrawn position 201. It should be noted that the movement range of the rear curtain driving pin 282 is substantially the same as the range over which the elongated hole 270 extends.

While the front curtain driven arm 231 moves along the rear surface of the substrate 210, the rear curtain driving pin 282 penetrating through the elongated hole 270 of the substrate 210 protrudes to the rear side of the substrate 210. If the front curtain driven arm 231 has a form linearly connecting the substrate-side coupling part 232 and the light-shielding member-side coupling part 233, a movement range of the front curtain driven arm 231 overlaps the movement range of the rear curtain driving pin 282. In other words, if the front curtain driven aim 231 is a form linearly extending along the straight line La, a side surface of an upper side of the front curtain driven arm 231 in the figures is located in a position denoted by a dashed double-dotted line 291 in FIG. 5(*b*) in a state where the front curtain light-shielding blade 220 is withdrawn in the first withdrawn position 201. Even if the front curtain driven arm 231 has a linear form along the straight line La as described above, the side surface (corresponding to the dashed double-dotted line 291) of the front curtain driven arm and a side surface of the rear curtain driving pin 282 cannot collide with each other when the front curtain light-shielding blade 220 is withdrawn in the first withdrawn position. 201, as long as the rear curtain driving pin 282 remains at the top right of the elongated hole 270. However, if the rear curtain driving pin 282 moves toward the lower left of the elongated hole 270 for some reason with the front curtain light-shielding blade 220 being withdrawn in the first withdrawn position 201, the side surface (corresponding to the dashed double-dotted line 291) of the front curtain driven arm having a linear form along the straight line La and the side surface of the rear curtain driving pin 282 collide with each other, which can damage the front curtain driven arm.

Figure 6:
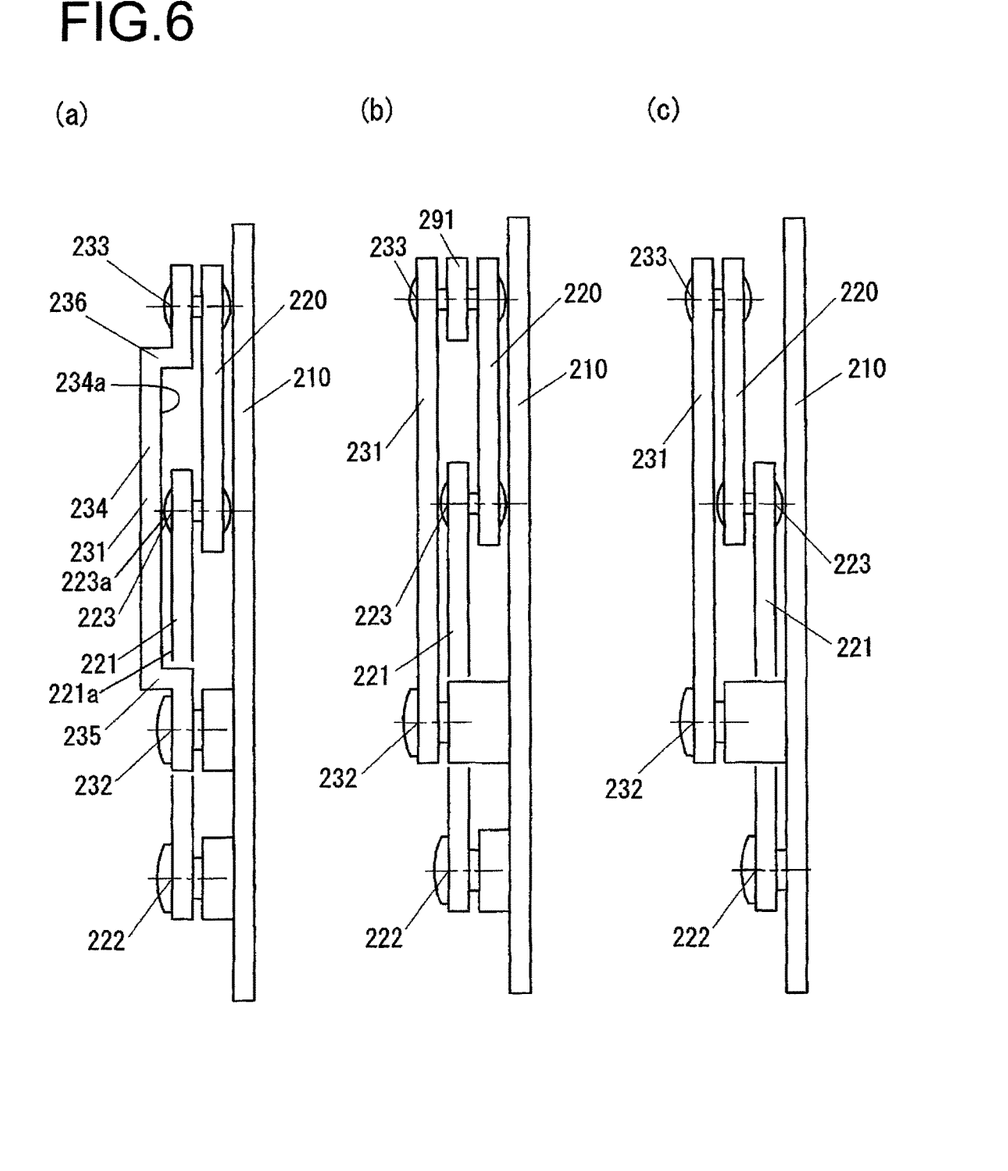
FIG. 6 is a schematic view illustrating how a front curtain driving arm and the front curtain driven arm overlap each other.

As illustrated in FIG. 5(*a*), the front curtain driven arm 231 in this embodiment is thus curved to be convex toward the front curtain driving arm 221 so that the front curtain driven arm 231 does not overlap the elongated hole 270, that is, the movement range of the rear curtain driving pin 282. This curve causes the curved portion of the front curtain driven arm 231 to partly overlap the front curtain driving arm 221. For the purpose of avoiding the interference between the curved portion of the front curtain driven arm 231 and the front curtain driving arm 221, the front curtain driven arm 231 is provided with a stepped portion 235 in the vicinity of the substrate-side coupling part 232 and a stepped portion 236 in the vicinity of the light-shielding member-side coupling part 233, as explicitly illustrated in FIG. 5(*a*) and FIG. 6(*a*). These stepped portions 235, 236 allow an intermediate portion 234 of the front curtain driven arm 231 extending between the stepped portions 235, 236 to be arranged at a distance from the front curtain driving arm 221. This avoids the interference between the intermediate portion 234 of the front curtain driven arm 231 and the front curtain driving arm 221.

It should be noted that any contact between the surface 234*a* of the front curtain driven arm 231 and the surface 221*a* of the front curtain driving arm 221 or the surface 223*a* of the light-shielding member coupling part 223 does not lead to a problem in operation since the front curtain driven arm 231 and the front curtain driving arm 221 or the light-shielding member coupling part 223 are displaced with respect to each other in the direction in which they overlap each other. Although a friction loss may be caused by the contact in this case, the performance of the shutter can be maintained only by a driving force being changed in accordance with a change in the friction loss. Additionally, the durability is not reduced since the surfaces are not in firm contact with each other.

As described above, the front curtain driven arm 231 is curved to be convex toward the front curtain driving arm 221 so as not to overlap the elongated hole 270. This curve of the front curtain driven arm 231 forms a recessed region 292, which is denoted by hatching as illustrated in FIG. 5(*b*). Instead of or in addition to the elongated hole 270, other components may be arranged in the recessed region 292. This enables the shutter components to be densely arranged and reduces the size of the shutter device 21.

It should be noted that the stepped portions 235, 236 described above may be omitted if the curved portion, namely, the intermediate portion 234 of the front curtain driven arm 231 does not overlap the front curtain driving arm 221 even though the front curtain driven arm 231 is curved so as not to overlap the elongated hole 270. Furthermore, although the front curtain driven arm 231 is curved to be convex toward the front curtain driving arm 221 in the above embodiment, the front curtain driven arm 231 may be curved to be convex in a direction away from the front curtain driving arm 221 so as not to overlap the elongated hole 270, depending on the relative positional relationship between the front curtain driven arm 231 and the elongated hole 270.

In terms of the positional relationship between the opening 215 and the elongated hole 270, in this embodiment, the front curtain driven arm 231 and the front curtain driving arm 221 are located between a shorter side edge 215a of the opening 215 and one end 270a of the elongated hole 270 in the first withdrawn position 201, as illustrated in FIG. 5(a).

FIGS. 6(b) and 6(c) are schematic side views of the front curtain driving arm 221 and the front curtain driven arm 231, illustrating other examples in which the front curtain driving arm 221 and the front curtain driven arm 231 overlap each other in different a manners. As illustrated in FIG. 6(b), for example, the front curtain driven arm 231 may be displaced toward the rear side of the front curtain driving arm 221, without the stepped portions 235 and 236 provided in the front curtain driven arm 231. In other words, the entire front curtain driven arm 231 is displaced with respect to the front curtain driving arm 221 in the direction in which the arms overlap each other. In FIG. 6(b), reference numeral 291 denotes a spacer interposed between the front curtain light-shielding blade 220 and the front curtain driven arm 231. Such a configuration also achieves the same operational advantage as in the case where the stepped portions 235, 236 are provided so that the intermediate portion 234 is displaced with respect to the front curtain driving arm 221 in the direction in which the intermediate portion 234 and the front curtain driving arm 221 overlap each other. It should be noted that the spacer 291 may be integrated with the front curtain driven arm 231, the front curtain light-shielding blade 220, or the light-shielding member coupling part 223.

Alternatively, as illustrated in FIG. 6(c), the front curtain driving arm 221 may be coupled to the front curtain light-shielding blade 220 on its front side surface (the subject side), while the front curtain driven arm 231 may be coupled to the front curtain light-shielding blade 220 on the rear side surface (the image sensor 22 side) of the front curtain light-shielding blade 220. Although not illustrated, the front curtain driving arm 221 may be coupled to the front curtain light-shielding blade 220 on the rear side surface (the image sensor 22 side), while the front curtain driven arm 231 may be coupled to the front curtain light-shielding blade 220 on the front side surface (the subject side) of the front curtain light-shielding blade 220. In other words, the front curtain driving arm 221 and the front curtain driven arm 231 may be coupled to the front curtain light-shielding blade 220 on opposite surfaces of the front curtain light-shielding blade 220. Such a configuration also achieves the same operational advantage as in the case where both the front curtain driving arm 221 and the front curtain driven arm 231 are coupled to the front curtain light-shielding blade 220 on the rear side surface (the image sensor 22 side) of the front curtain light-shielding blade 220 and the stepped portions 235, 236 are provided so that the intermediate portion 234 is displaced with respect to the front curtain driving arm 221 in the direction in which the intermediate portion 234 and the front curtain driving arm 221 overlap each other.

In FIGS. 6(a), (b), and (c) described above, thicknesses of members and gaps between adjacent members in the horizontal direction are emphasized for convenience of explanation. As described above with reference to FIG. 5(a), gaps between members are not indispensable. The members may partly contact with each other as long as they are displaced in the direction in which they overlap each other. Additionally, as illustrated in FIG. 6(a), both the front curtain driving arm 221 and the front curtain driven arm 231 are coupled to the front curtain light-shielding blade 220 on the rear side surface (the image sensor 22 side) of the front curtain light-shielding blade 220.

—Operation of the Shutter Device 21—

The shutter device 21 configured as described above operates as follows. Before the user operates the release button, both the front curtain light-shielding blade 220 and the rear curtain light-shielding blade 250 are located in the first withdrawn position 201 as illustrated in FIG. 2 so that subject light having passed through the photographic lens 11 is incident onto the image sensor 22 through the opening 215. Image-capturing signals are repeatedly read out from the image sensor 22 and images (preview images) corresponding to the image-capturing signals are displayed on the rear side monitor 30. This process is referred to as a live view display.

When the user operates the release button, the power supply unit (not shown) of the controller 26 starts to supply an electric power to the front curtain actuator (not shown) for shifting the front curtain light-shielding blade 220. When being supplied with the electric power, the front curtain actuator rotates the front curtain driving pin 281 along the elongated hole 240 in the counterclockwise direction in. FIG. 2. As a result, the front curtain driving arm 221 and the front curtain driven arm 231 are rotated about the substrate-side coupling part 222 and the substrate-side coupling part 232, respectively, in a plane parallel to the XY plane so that the front curtain light-shielding blade 220 shifts from the first withdrawn position 201 in the positive Y axis direction. A bottom edge 220B of the front curtain light-shielding blade 220 starts to enter the area of the opening 215 and thus shield the image-capturing plane of the image sensor 22 behind the shutter. The image sensor 22 resets stored charge (pixel reset) for pixels in the shielded region, in synchronization with the movement of the front curtain light-shielding blade 220. When the upper edge 220U of the front curtain light-shielding blade 220 passes through the region of the image sensor 22 that has been shielded by the front curtain light-shielding blade 220 as illustrated in FIG. 3, an exposure is started in the image-capturing plane of the image sensor 22 to store electric charges for the image-capturing region and thus its pixels through which the upper edge 200U passes. In this way, when the upper edge 220U shifts in the positive V axis direction beyond the bottom end 215E of the opening 215 so that the front curtain light-shielding blade 220 moves to the second withdrawn position 202 (see FIG. 4), the pixel reset and the exposure (i.e., the charge storage) are performed for the entire image-capturing plane of the image sensor 22.

In this context, the controller 26 controls the timing of pixel reset for each of pixel rows extending in the X axis direction that constitute the image sensor 22, in accordance with (in synchronization with) the shift of the front curtain light-shielding blade 220 in the positive Y axis direction. In other words, the controller 26 resets pixels in the range shielded by the front curtain light-shielding blade 220 of the image sensor 22.

Once a time equivalent to the exposure time has elapsed since the front curtain light-shielding blade 220 started to shift, the power control unit (not shown) of the controller 26 supplies an electric power to the rear curtain actuator (not shown) for shifting the rear curtain light-shielding blade 250. When the rear curtain actuator is supplied with the electric power, the rear curtain actuator rotates the rear curtain driving pin 282 along the elongated hole 270 in the counterclockwise direction in FIG. 2. As a result, the rear curtain driving arm 251 and the rear curtain driven arm 261 are rotated about the substrate-side coupling part 252 and the substrate-side coupling part 262, respectively, in a plane parallel to the XY plane so that the rear curtain light-shielding blade 250 shifts from the first withdrawn position 201 in the positive Y axis direction.

In this way, the front curtain light-shielding blade 220 first starts to shift in the positive Y axis direction and, after a time equivalent to the exposure time has elapsed, the rear curtain light-shielding blade 250 then starts to shift in the positive Y axis direction. Consequently, subject light is incident onto the image sensor 22 after the reset, only during the exposure time, from a space between the upper edge 220U (FIG. 3) of the front curtain light-shielding blade 220 and the lower end of the lowermost blade of the rear curtain light-shielding blade 250. The image sensor 22 is exposed with the subject light.

Thereafter, the rear curtain light-shielding blade 250 moves to the light-shielding position where it covers the entire opening 215.

The controller 26 controls the image sensor 22 to start to sequentially read pixels from the outermost pixel row on the negative Y axis side. Upon completion of reading the image-capturing signals from all the pixel rows, the controller 26 outputs driving signals from the power supply unit (not shown) to cause the front curtain actuator and the rear curtain actuator to shift the front curtain light-shielding blade 220 and the rear curtain light-shielding blade 250, respectively, in the negative Y axis direction. Then, the blades are stored in the first withdrawn position 201 and the controller 26 ends the operational control for the shutter device 21 at the photographing, In this embodiment, the front curtain light-shielding blade 220 and the rear curtain light-shielding blade 250 are stored in the first withdrawn position 201 until the photographing starts, as described above. In contrast to the case where the front curtain light-shielding blade 220 and the rear curtain light-shielding blade 250 are stored in positions that are opposite to each other with the opening 215 therebetween, it is thus not necessary to shift the front curtain light-shielding blade 220 to a stored position at the start of the photographing. As a result, a release time lag is eliminated or minimized.

If the user operates the release button and then a malfunction of the power supply unit causes an electric power to be supplied to the rear curtain actuator before the front curtain actuator, for example, the rear curtain driving pin 282 rotates in the counterclockwise direction along the elongated hole 270 from the state illustrated in FIG. 2 (or FIG. 5(a)) while the front curtain remains in the state illustrated in FIG. 2 (or FIG. 5(a)). Nevertheless, the rear curtain driving pin 282 does not interfere with the front curtain driven arm 234. Additionally, even if a mechanical shock is applied to the camera in the state of FIG. 2 (or FIG. 5(a)) to cause only the rear curtain to shift, the rear curtain driving pin 234 and the front curtain driven arm 234 do not interfere with each other. Resetting the camera from these states to its initial state and thus returning the shutter to the state illustrated in FIG. 2 enables an additional photographing to be performed.

This embodiment provides the following operational advantages.

(1) The shutter device 21 includes: the front curtain light-shielding blade 220 that can move to the first withdrawn position 201 and the second withdrawn position 202, the first and second withdrawn position 201, 202 being opposite to each other with the opening 215 therebetween; and the front curtain driving arm 221 and the front curtain driven arm 231 that move the front curtain light-shielding blade 220. Furthermore, the front curtain driven arm 231 arranged on the first withdrawn position 201 side is curved to be convex toward the front curtain driving arm 221. Other shutter components such as the elongated hole 270 can be arranged in the space of the curved and recessed portion (the recessed region 292) formed by the curve of the front curtain driven arm 231. Specifically, it is possible to prevent the interference between the front curtain driven arm 231 and the rear curtain driving pin 282. The front curtain light-shielding blade 220 and the rear curtain light-shielding blade 250 can therefore be stored in the first withdrawn position 201 until the photographing starts, so that the release time lag can be eliminated or minimized as described above.

(2) The front curtain driven arm 231 is curved so as to overlap the front curtain driving arm 221. In other words, one of the arms constituting the parallel link mechanism is curved so as to overlap the other arm. The recessed region 292 formed by the curve of the front curtain driven arm 231 can be extended as compared with the case where the front curtain driven arm 231 and the front curtain driving arm 221 do not overlap each other. This extends the space in which other shutter components such as the elongated hole 270 may be arranged, which can further contribute to reduce the size of the shutter device 21 and the digital camera 1. Furthermore, the overlap of the front curtain driven arm 231 and the front curtain driving arm 221 can prevent elastic deformation of the arms.

(3) The curve of the front curtain driven arms 231 made so as to overlap the front curtain driving arm 221 can avoid an increased thickness of the shutter device 21 in the optical axis direction, as compared with the case where the interference between the front curtain driven arm 231 and the rear curtain driving pin 282 can be prevented by the curvature of the front curtain driven arm 231 in the optical axis direction. This can contribute to reduce the size of the shutter device 21 and the digital camera 1.

(4) Not the front curtain driving arm 221 which receives the driving force transmitted from the front curtain driving pin 281, but the front curtain driven arm 231 is configured to be curved. This configuration can prevent the interference between the front curtain driven arm 231 and the rear curtain blade driving pin 282 without affecting the weight and strength of the front curtain driving arm 221 and thus maintain the performance of the shutter device 21.

(5) The front curtain driven arm 231 is provided with the intermediate portion 234 that overlaps the front curtain driving arm 221 between the substrate-side coupling part 232 and the light-shielding member-side coupling part 233. Furthermore, the stepped portion 235 is provided between the substrate-side coupling part 232 and the intermediate portion 234 and the stepped portion 236 is provided between the light-shielding member-side coupling part 233 and the intermediate portion 234, so that the intermediate portion 234 is displaced with respect to the front curtain driving arm 221 in the direction in which the intermediate portion 234 and the front curtain driving arm 221 overlap each other. This can prevent the interference between the front curtain driving arm 221 and the front curtain driven arm 231 in the intermediate portion 234, without reducing the durability of the shutter device 21.

(6) The front curtain driven arm 231 is shaped so as not to overlap the movement range of the rear curtain driving pin 282 even in a state where the front curtain light-shielding blade 220 has been moved into the first withdrawn position 201. Consequently, the front curtain driving arm 221 and the front curtain driven arm 231 do not interfere with the rear curtain driving pin 282 even when the movement range of the front curtain light-shielding blade 220 is made wider than that in a conventional shutter device. The front curtain light-shielding blade 220 and the rear curtain light-shielding blade 250 can therefore be stored in the first withdrawn position 201 until the photographing starts, so that the release time lag can be eliminated or minimized as described above.

(7) Of the front curtain driving arm 221 and the front curtain driven arm 231 constituting the parallel link mechanism, not the front curtain driving arm 221 which transmits the driving force for moving the front curtain light-shielding blade 220, but the front curtain driven arm 231 which is driven together with the front curtain light-shielding blade 220 by the front curtain driving arm 221 has the shape for avoiding the interference with the movement range of the rear curtain driving pin 282. This can maintain the performance of the shutter device 21 without increasing a transmission loss of the driving force.

(8) The front curtain driven arm 231 is configured to be located between the opening 215 and the elongated hole 270 when the front curtain light-shielding blade 220 is withdrawn in the first withdrawn position 201. This can extend the movement range of the front curtain light-shielding blade 220 and prevent the interference between the front curtain driven arm 231 and the rear curtain driving pin 282. Additionally, the front curtain driven arm 231 withdraws from the opening 215 while the front curtain light-shielding blade 220 is withdrawn into the first withdrawn position 201, so that the front curtain driven arm 231 can have no influence on the live view display.

(9) The front curtain light-shielding blade 220 can move to the first withdrawn position 201 and the second withdrawn position 202, and the movement ranges of the front curtain driven arm 231 and the rear curtain driving pin 282 do not overlap each other. Consequently, the front curtain driven arm 231 does not interfere with the rear curtain driving pin 282 even when the movement range of the front curtain light-shielding blade 220 is made wider than that in a conventional shutter device. The front curtain light-shielding blade 220 and the rear curtain light-shielding blade 250 can therefore be stored in the first withdrawn position 201 until the photographing starts, so that the release time lag can be eliminated or minimized as described above.

—Variations—

(1) In the above description, the front curtain driven arm 231 is curved to be convex toward the front curtain driving arm 221. Alternatively, the front curtain driving arm 221 may be curved to be convex toward the front curtain driven arm 231. For example, the front curtain driving arm 221 may be curved to be convex toward the front curtain driven arm 231 if the front curtain driving arm 221 is provided above the front curtain driven arm 231 in the figures and is closer to the rear curtain driving pin 282 than the front curtain driven arm 231, which can cause the interference between the front curtain driving arm 221 and the rear curtain driving pin 282.

(2) In the above description, the configuration for preventing the interference between the rear curtain driving pin 282 and the front curtain driven arm 231 has been described. However, the rear curtain driving arm 251 or the rear curtain driven arms 261 may be curved if the rear curtain driving arm 251 or the rear curtain driven arm 261 can interfere with the members for driving the front curtain light-shielding blade 220.

(3) in the above description, the front curtain driving arm 221 and the front curtain driven arm 231 are configured so as to overlap in the optical axis direction of the subject light. However, the overlap of the front curtain driving arm 221 and the front curtain driven arm 231 is not indispensable. The front curtain driving arm 221 and the front curtain driven arm 231 may not overlap each other.

(4) In the above description, the front curtain driven arm 231 is provided with the stepped portions 235, 236. Alternatively, the front curtain driving arm 221 may be provided with stepped portions equivalent to the stepped portions 235, 236.

Figure 7:
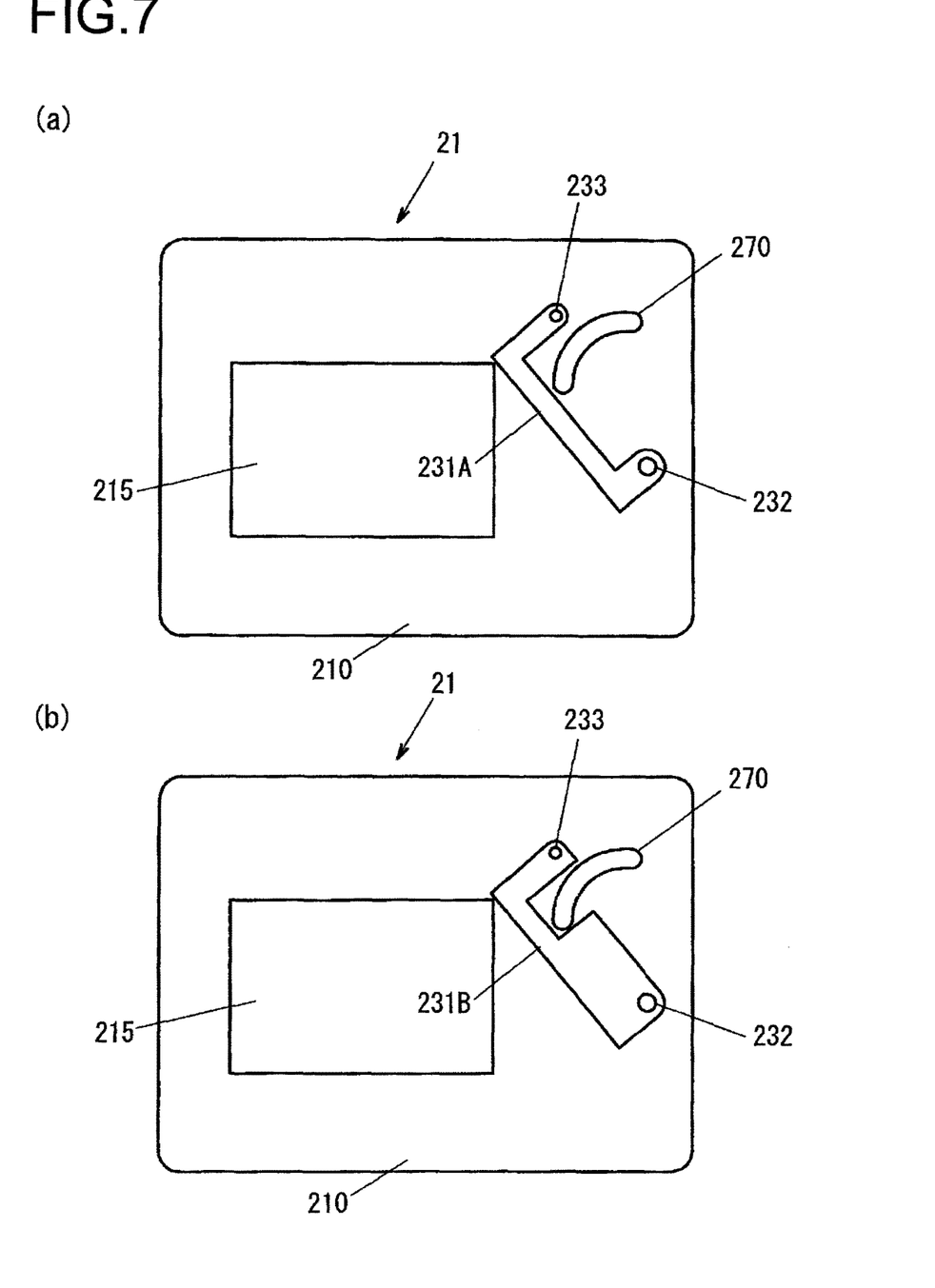
FIG. 7 is a view illustrating variations.

(5) The shape of the front curtain driven arm 231 in the above description is merely exemplary, and other implementations as illustrated in FIG. 7 may be employed. FIG. 7 is a view schematically illustrating other implementations of the front curtain driven arm 231. For example, the front curtain driven arm 231A may be bent into a U-shape, as schematically illustrated in FIG. 7(a). Alternatively, the front curtain driven arm 231B may have a wide form and be bent with a cutout 231a so as to extend around the elongated hole 270 of the substrate 210, as schematically illustrated in FIG. 7(b).

(6) In the above description, the front curtain actuator is made of an electric motor or the like. Alternatively, the front curtain actuator may be configured to shift the front curtain light-shielding blade 220 toward the second withdrawn position 202 by a biasing force of a spring and to urge the front curtain light-shielding blade 220 into the first withdrawn position 201 by a power of the electric motor. The same also applies to the rear curtain actuator. Furthermore, the front curtain actuator may be made of an electric motor or the like, while the rear curtain actuator may be constituted by a spring and an electric motor. Still further, the front curtain actuator may be constituted by a spring and an electric motor, while the rear curtain actuator may be made of an electric motor or the like.

(7) In the above description, the first withdrawn position 201 is provided above the opening 215 on the figures and the second withdrawn position 202 is provided below is the opening 215 on the figures. Alternatively, the first withdrawn position 201 may be provided below the opening 215 and the second withdrawn position 202 may be provided above the opening 215 on the figures. If the front curtain light-shielding blade 220 and the rear curtain light-shielding blade 250 are configured to move across the opening 215 in the X axis direction, the first withdrawn position 201 may be provided on either the right or left side of the opening 215 on the figures and the second withdrawn position 202 may be provided on the other side of the opening 215.

(8) The above-described embodiment and variations may be combined.

The disclosure of the following priority application is herein incorporated by reference:

Japanese Patent Application No. 2014-223428 (filed Oct. 31, 2014)

REFERENCE SIGNS LIST

1 . . . digital camera, 21 . . . shutter device, 22 . . . image sensor, 210 . . . substrate, 215 . . . opening, 220 . . . front curtain light-shielding blade, 221 . . . front curtain driving arm, 222 . . . substrate-side coupling part, 223 . . . shielding member-side coupling part, 231 . . . front curtain driven arm, 232 . . . substrate-side coupling part, 233 . . . shielding member-side coupling part, 234 . . . intermediate portion, 235, 236 . . . stepped portion, 240, 270 . . . elongated hole, 250 . . . rear curtain light-shielding blade, 251 . . . rear curtain driving arm, 261 . . . rear curtain driven arm, 281 . . . front curtain driving pin, 282 . . . rear curtain driving pin

The invention claimed is:

1. A shutter device, comprising:
    a substrate having an opening;
    a first light-shielding member that moves from a first position outside the opening of the substrate to a second position outside the opening to shield the opening, the second position being different from the first position;
    a second light-shielding member that partly shields the opening while moving from the first position to the second position;
    a first moving member that has a protrusion moving along a hole provided in the substrate to move the first light-shielding member;
    a second moving member that is coupled to the second light-shielding member and moves together with the second light-shielding member; and
    a third moving member, located outside a movement range of the protrusion during the second light-shielding member being located in the first position, that is coupled to the second light-shielding member and moves together with the second light-shielding member.

2. The shutter device according to claim 1, wherein:
    the third moving member is curved so as to locate between a movement range of the first moving member and the opening while the second light-shielding member is located in the first position.

3. The shutter device according to claim 1, wherein:
    the second moving member and the third moving member constitute a parallel link mechanism for moving the second light-shielding member; and
    the third moving member at least partly overlaps the second moving member.

4. The shutter device according to claim 3, wherein:
    each of the second moving member and the third moving member is coupled to the second light-shielding member on one of surfaces of the second light-shielding member; and
    one of the second moving member and the third moving member has a step in an area where the members overlap each other.

5. The shutter device according to claim 3, wherein:
    the second moving member and the third moving member are coupled to the second light-shielding member on opposite surfaces of the second light-shielding member.

6. An image-capturing apparatus, comprising:
    the shutter device according to claim 1; and
    an image sensor that receives subject light through the shutter device.

* * * * *